United States Patent
Liao et al.

(10) Patent No.: US 10,339,408 B2
(45) Date of Patent: *Jul. 2, 2019

(54) METHOD AND DEVICE FOR QUASI-GIBBS STRUCTURE SAMPLING BY DEEP PERMUTATION FOR PERSON IDENTITY INFERENCE

(71) Applicant: TCL RESEARCH AMERICA INC., San Jose, CA (US)

(72) Inventors: Xinpeng Liao, San Jose, CA (US); Xinyao Sun, San Jose, CA (US); Xiaobo Ren, San Jose, CA (US); Haohong Wang, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 358 days.

This patent is subject to a terminal disclaimer.

(21) Appl. No.: 15/388,039

(22) Filed: Dec. 22, 2016

(65) Prior Publication Data
US 2018/0181842 A1      Jun. 28, 2018

(51) Int. Cl.
*G06K 9/46*      (2006.01)
*G06K 9/62*      (2006.01)
*G06K 9/00*      (2006.01)

(52) U.S. Cl.
CPC ......... *G06K 9/4604* (2013.01); *G06K 9/4628* (2013.01); *G06K 9/6274* (2013.01); *G06K 9/6276* (2013.01); *G06K 9/6296* (2013.01); *G06K 9/0063* (2013.01); *G06K 9/00771* (2013.01)

(58) Field of Classification Search
CPC .. G06K 9/4604; G06K 9/6296; G06K 9/4628; G06K 9/6276; G06K 9/6274; G06K 9/00771; G06K 9/0063
See application file for complete search history.

(56) References Cited

U.S. PATENT DOCUMENTS

| | | | |
|---|---|---|---|
| 9,430,697 B1* | 8/2016 | Iliadis | G06F 16/50 |
| 2017/0083754 A1* | 3/2017 | Tang | G06K 9/00281 |
| 2017/0200067 A1* | 7/2017 | Zhou | G06T 7/143 |

* cited by examiner

*Primary Examiner* — John W Lee
(74) *Attorney, Agent, or Firm* — Anova Law Group, PLLC

(57) ABSTRACT

The present disclosure provides a method and device for visual appearance based person identity inference. The method may include obtaining a plurality of input images. The input images include a gallery set of images containing persons-of-interest and a probe set of images containing person detections, and one input image corresponds to one person. The method may further include extracting N feature maps from the input images using a Deep Neural Network, N being a natural number; constructing N structure samples of the N feature maps using conditional random field (CRF) graphical models; learning the N structure samples from an implicit common latent feature space embedded in the N structure samples; and according to the learned structures, identifying one or more images from the probe set containing a same person-of-interest as an image in the gallery set.

14 Claims, 4 Drawing Sheets

METHOD AND DEVICE FOR QUASI-GIBBS STRUCTURE SAMPLING BY DEEP PERMUTATION FOR PERSON IDENTITY INFERENCE

FIELD OF THE DISCLOSURE

The present disclosure generally relates to the field of image processing technologies and, more particularly, relates to a method and device for person identity inference using Quasi-Gibbs structure sampling by deep permutation.

BACKGROUND

Visual appearance based person re-identification (re-id) has been an active topic in the past few years, and will remain to be one in a foreseeable future. The re-id task involves assigning the same identifier to all occurrences of a particular individual captured in a series of images or videos, even when the occurrences are significantly different in time or space.

In existing technologies, given a probe image and a gallery set containing a list of persons-of-interest, image search may be performed to return ranked list of persons-of-interest, or a multi-class classifier may be trained on the gallery set. These approaches are mainly devoted to feature representation and distance metric learning that hopefully assumes invariance to appearance variations due to different camera views, significant gaps over time and space. However, existing image retrieval frameworks cannot handle well the intra-class variability and inter-class similarity without any heuristic constraints imposed.

Another approach involves modeling the re-id structure between a gallery set and a probe set, thereby inferring all the image labels in the probe set rather than labeling each probe image individually. Such re-id structures may be modeled as a bipartite graph or a Conditional Random Field (CRF). The structural construction of these models is either learned from large amounts of manually labeled image pairs (one gallery image and one probe image associated with the same person identifier), or handcrafted based on heuristics, e.g., edge topology.

However, manually obtaining strong re-id structure priors are prohibitively expensive and unavailable in practice. Further, handcrafted structures ignore the uncertainty nature of this statistical inference problem. In addition, there does not yet exist a principled approach to derive a common latent feature space for the re-id problem.

The disclosed method and system are directed to solve one or more problems set forth above and other problems.

BRIEF SUMMARY OF THE DISCLOSURE

One aspect of the present disclosure provides a method for visual appearance based person identity inference. The method may include obtaining a plurality of input images. The input images include a gallery set of images containing persons-of-interest and a probe set of images containing person detections. The method may further include extracting N feature maps from the input images using a Deep Neural Network, N being a natural number; constructing N structure samples of the N feature maps using conditional random field (CRF) graphical models; learning the N structure samples from an implicit common latent feature space embedded in the N structure samples; and according to the learned structures, identifying one or more images from the probe set containing the same persons-of-interest as images in the gallery set.

Another aspect of the present disclosure provides a device for visual appearance based person identity inference. The device may include one or more processors configured to obtain a plurality of input images. The input images include a gallery set of images containing persons-of-interest and a probe set of images containing person detections, and one input image corresponds to one person. The one or more processors are further configured to extract N feature maps from the input images using a Deep Neural Network, N being a natural number; construct N structure samples of the N feature maps using conditional random field (CRF) graphical models; learn the N structure samples from an implicit common latent feature space embedded in the N structure samples; and according to the learned structures, identify one or more images from the probe set containing a same person-of-interest as an image in the gallery set.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to the drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

Figure 1:
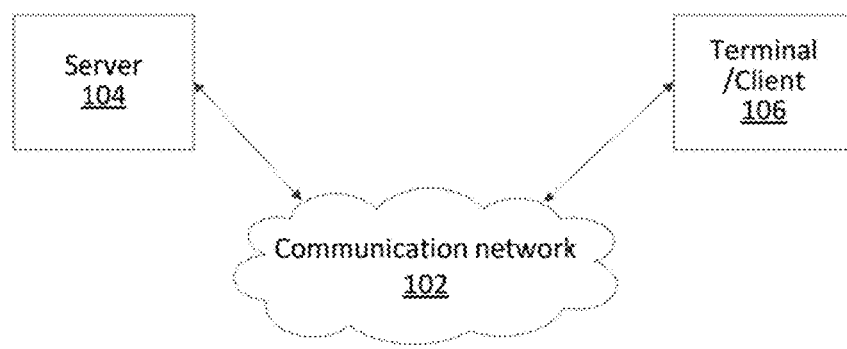
FIG. 1 illustrates an exemplary environment incorporating certain embodiments of the present invention.

FIG. 1 illustrates an exemplary environment 100 incorporating exemplary methods and devices for person identity inference in accordance with various disclosed embodiments. As shown in FIG. 1, the environment 100 can include a server 104, a terminal 106, and a communication network 102. The server 104 and the terminal 106 may be coupled through the communication network 102 for information exchange, such as sending and receiving images containing person detections, etc. Although only one terminal 106 and one server 104 are shown in the environment 100, any number of terminals 106 or servers 104 may be included, and other devices may also be included.

The communication network 102 may include any appropriate type of communication network for providing network connections to the server 104 and terminal 106 or among multiple servers 104 or terminals 106. For example, the communication network 102 may include the Internet or other types of computer networks or telecommunication networks, either wired or wireless.

A terminal, as used herein, may refer to any appropriate user terminal with certain computing capabilities including, e.g., collecting images containing persons-of-interest, displaying person identity inference results. For example, a terminal can be a personal computer (PC), a work station computer, a server computer, a hand-held computing device (tablet), a mobile terminal (a mobile phone or a smart phone), or any other user-side computing device.

A server, as used herein, may refer to one or more server computers configured to provide certain server functionalities, such as maintaining an image database, extracting feature maps for input images, sampling structures of the feature maps, visualizing graphic models constructed based on the feature maps, learning the structure samples for identity inference. The server may also include one or more processors to execute computer programs in parallel.

Figure 2:
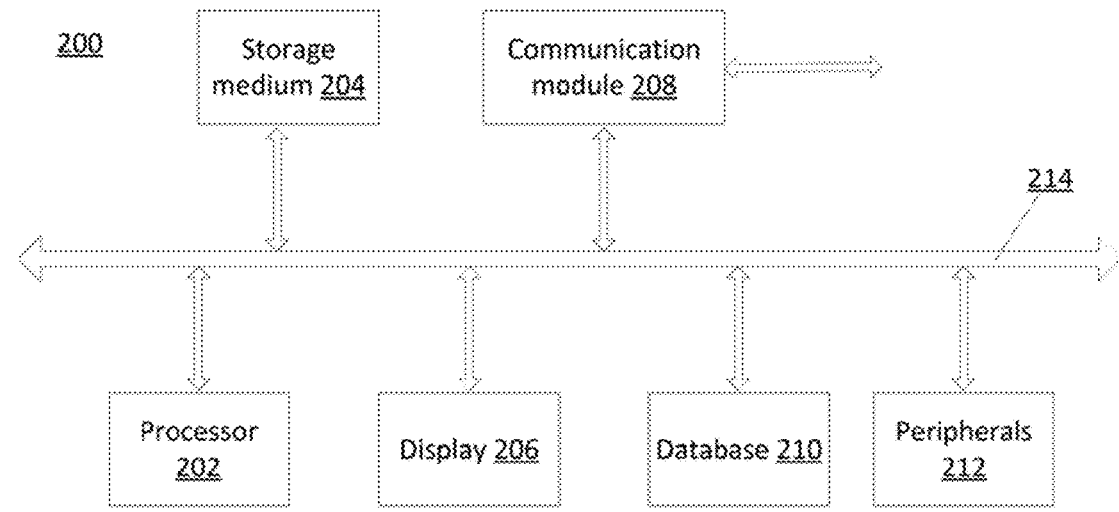
FIG. 2 illustrates an exemplary computing system, consistent with the disclosed embodiments.

The server 104 and the terminal 106 may be implemented on any appropriate computing platform. FIG. 2 shows a block diagram of an exemplary computing system 200 capable of implementing the server 104 and/or the terminal 106. As shown in FIG. 2, computing system 200 may include a processor 202, a storage medium 204, a display 206, a communication module 208, a database 210, and peripherals 212, and one or more bus 214 to couple the devices together. Certain devices may be omitted and other devices may be included.

Processor 202 may include any appropriate processor or processors. Further, processor 202 can include multiple cores for multi-thread or parallel processing. Processor 202 may execute sequences of computer program instructions or program modules to perform various processes, such as an image processing program. Storage medium 204 may include memory modules, such as ROM, RAM, flash memory modules, and erasable and rewritable memory, and mass storages, such as CD-ROM, U-disk, and hard disk, etc. Storage medium 204 may store computer program instructions or program modules for implementing various processes, when executed by processor 202.

Further, communication module 208 may include network devices for establishing connections through the communication network 102. Database 210 may include one or more databases for storing certain data (e.g., images and videos) and for performing certain operations on the stored data, such as database searching and data retrieving.

Display 206 may include any appropriate type of computer display device or electronic device display (e.g., CRT or LCD based devices, touch screens, LED display). Peripherals 212 may include various sensors and other I/O devices, such as speaker, camera, motion sensors, keyboard, mouse, etc.

In operation, the terminal 106 and/or the server 104 can perform certain actions for person identity inference based on images containing person detections. The terminal 106 and/or the server 104 may be configured to provide structures and functions for such actions and operations. In some embodiments, some part of the actions may be performed on the server 104, and other part of the actions may be performed on the terminal 106.

The present disclosure provides a method and device for person identity inference. Person identity inference, or person re-identification (re-id), as used herein, may refer to finding, in a first image set (probe set), one or more images containing the same persons as images from a second image set (gallery set). Further, the disclosed method and device may infer all images from the probe set containing same persons as images in the gallery set rather than labeling each probe image sequentially. Person detection, or detected person, as used herein, may refer to a person contained in an image. One image may contain one detected person. Person-of-interest, as used herein, may refer to the detected person in an image from the gallery set.

The main challenge of the visual appearance based re-id problem resides in that the visual appearance of the same person may have more dissimilarity than the appearance similarity between different persons. For example, person images usually present severe difference due to changes in human pose, illumination, viewpoint, background clutter, occlusion, and image resolution. In addition, cameras are usually at non-overlapping locations, and the camera view that the same person would appear is unpredictable. Therefore, it is extremely challenging to separate impostors from the real persons-of-interest while accommodating appearance variations of the same persons-of-interest, even with the camera network topology, if ever available.

Figure 3A:
FIG. 3A illustrates a block diagram of an exemplary device for person identity inference consistent with the disclosed embodiments.
Figure 3B:
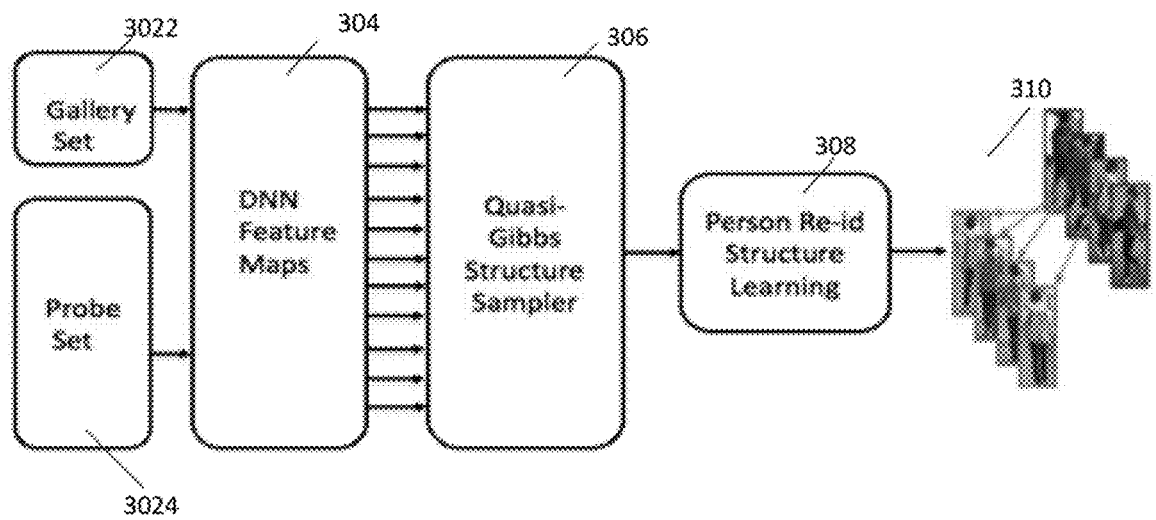
FIG. 3B illustrates an exemplary framework for person identity inference consistent with the disclosed embodiments.

FIG. 3A illustrates a block diagram of an exemplary device 300 for person identity inference consistent with the disclosed embodiments, and FIG. 3B illustrates an exemplary framework for person identity inference consistent with the disclosed embodiments corresponding to the exemplary device shown in FIG. 3A. As shown in FIG. 3A, the device 300 may include an image acquisition module 302, a feature map extraction module 304, a structure sampling module 306, a structure learning module 308, and an identity inference module 310. The device 300 may be implemented by the terminal 106 and/or the server 104.

Referring to FIG. 3A and FIG. 3B, the image acquisition module 302 may be configured to obtain input images including a gallery set 3022 and a probe set 3024. Given the gallery set 3022 of persons-of-interest from a first camera view and the probe set 3024 from a second camera view, the re-id problem is formulated to associate same persons-of-interest in the two camera views. A re-id structure invariant to person appearance variations between the gallery set and the probe set may be learned using the disclosed framework. It can be understood that, the process for person re-identification from one camera pair can be transferred to person re-id scenarios among different camera pairs.

For example, the gallery set 3022 may include a plurality of images of persons of interest, each person of interest may correspond to one image. The probe set 3024 may include a plurality of images of person detections. Some or all of the images in the probe set 3024 may contain the same persons-of-interest in the gallery set 3022. An image of one person from the gallery set 3022 and an image of the same person from the probe set 3024 may be taken by two different cameras from two angles at a same place, a same camera at different times, or two different cameras located at entirely different places. That is, the two images may include person appearance variations, such as different postures, illumination, viewpoint, background clutter, occlusion, and image resolution. The quantity of images in the probe set 3024 may be smaller, equal to, or greater than the quantity of images in the gallery set 3022. In some embodiments, the probe set 3024 may include more than one image that contain a same person-of-interest as an image from the gallery set 3022. In some embodiments, each image in the gallery set and the probe set may have same size, and contain a person-of-interest located in the center occupying roughly similar region in the image. The image acquisition module 302 may be configured to pre-process acquired images to obtain input images with same sizes, such as identifying regions-of-interest, cropping, zooming in/out, etc.

The feature map extraction module 304 may be configured to extract feature maps for the input images. In some embodiments, Deep Neural Network (DNN) feature maps may be extracted from the two image sets (i.e., the gallery set 3022 and the probe set 3024). For example, initial pixel-level features may be extracted from each image and fed into the DNN for subsequent sampling of training data. N different deep feature maps may be produced by one or more convolution layers of the DNN. Extraction results corresponding to a same deep feature space from all input images may form a feature map. Accordingly, the feature map extraction module 304 may obtain N feature maps. In some embodiments, N feature spaces corresponding to the N feature maps are orthogonal.

The structure sampler module 306 may be configured to obtain a structure sample for each feature map using conditional random field (CRF) graphical model. In other words, the structure sampler module 306 may take 'snapshots' of the true structure in different feature spaces that are orthogonal and able to capture various visual aspects. That is, the structures of the extracted feature maps may be sampled. In some embodiments, the structure sampler module 306 may be configured to apply a Quasi-Gibbs structure sampler with deep permutation to the N feature maps to obtain the corresponding N structure samples for learning the person association structure.

The interconnected nature of the same person with appearance variations may be more appropriately characterized by structured output models that are learned from different feature spaces. As a structured output version of Logistic regression, Conditional Random Fields (CRFs) are undirected graphical models that can be used to compactly represent data dependency between similar detected persons. The CRF topology can be learned from different deep feature spaces.

Further, the captured 'snapshots' may be formulated into a structure learning problem. The structure learning module 308 may be configured to learn the N structure samples with sparse approach from an implicit common latent feature space embedded in the N structure samples. A graph model representing a re-id structure may be obtained. The re-id structure, as used herein, may refer to a graph model learned based on the N structure samples to reveal the labelling of the probe images.

The identity inference module 310 may be configured to identifying one or more images from the probe set 3024 containing a same person-of-interest as an image in the gallery set 3022 according to the learned re-id structure. Specifically, when the person re-id structure is learned, an energy minimization may be used to cut the graph into several clusters with each labeled as one person-of-interest. That is, an image from the probe set 3024 is labeled with an image from the gallery set 3022 when the two images are determined to contain a same person.

The disclosed embodiments provide a device and method for learning the re-id structure that is invariant to person appearance variations between a gallery set and a probe set. First, a Quasi-Gibbs structure sampling approach is proposed and theoretically guaranteed to unveil the true re-id structure in different deep feature spaces that are effective in capturing different aspects in visual appearance. Second, re-id structure is searched from a class of Conditional Random Field via sparse approach with an implicit common latent feature space embedded in those structure samples. Neither human annotation efforts nor explicit feature fusion scheme is involved. Third, the disclosed embodiments, provide a new way for problem configuration. Given the assumption that the number and recurrent rate of persons-of-interest are relatively small compared with the size of the probe set which is increasing at a rate unprecedentedly seen, the re-id structure is learned among all the persons-of-interest candidates instead of all person images available.

Specifically, the re-id structure that is invariant to person appearance variations between a gallery set and a probe set may be learned, with neither human annotation efforts nor explicit feature fusion scheme. In an exemplary embodiment, without structure priors, CRFs with pairwise potentials, may be represented as:

$$p(Y|X) = \frac{1}{Z(X)} \prod_{\langle i,j \rangle} \psi_{ij}(y_i, y_j, X) \prod_i \psi_i(y_i, X) \quad (1)$$

where $\langle i,j \rangle$ is product over all edges in the graph. $\psi_i$ is a node potential (local evidence term) and $\psi_{ij}$ is an edge potential. $Z(X)$ denotes the normalization factor.

This formulation differs from existing technologies in three folds. First, conventional structure learning assumes the number of nodes is fixed and equals to the number of person detections (i.e. number of images). However, in the disclosed embodiments, for the conditional probability shown in Equation (1), Y refers to the joint labeling of all persons-of-interest candidates instead of all detected person. In other words, all the nodes in the structure-to-be-learned are persons-of-interest candidates, and the number of nodes is not known priori. Second, in the prior art, all learning models work in an explicitly specified feature space. However, in the disclosed embodiments, X in Equation (1) denotes the common latent features derived from structure samples implicitly (e.g., detailed descriptions may be found in step S406). Third, the disclosed structure learning may be considered as a case for clustering the same persons with appearance variations. Once the final underlying topology of this CRF is learned, any nodes associated with the nodes of persons-of-interest in the gallery set are assigned with the same labels after graph cut.

Assuming that the gallery set includes m different persons-of-interest, the number of states in each node is m, i.e., $y_i \in \{1, 2, \ldots, m\}$. Further, the node potential and the edge potential may be represented by the following terms:

$$\psi_i(\cdot, X) = \left(e^{V_{i,1}^T x_i}, e^{V_{i,2}^T x_i}, \ldots, e^{V_{i,m}^T x_i}\right) \quad (2)$$

$$\psi_{ij}(\cdot, \cdot, X) = \begin{pmatrix} e^{W_{ij,11}^T x_{ij}} & \cdots & e^{W_{ij,1m}^T x_{ij}} \\ \vdots & \ddots & \vdots \\ e^{W_{ij,m1}^T x_{ij}} & \cdots & e^{W_{ij,mm}^T x_{ij}} \end{pmatrix}$$

where $x_i$ denotes the node features and $x_{ij}$ are the edge features, with V and W being node parameters and edge parameters respectively. Neither node features nor edge features are explicitly specified in this formulation. In some cases, an alternative representation of the CRF model may be used (e.g., corresponding to detailed description of step S408). Let $\theta=[V,W]$ denote all the parameters, and F(X,Y) denote all the features, the CRF model in Equation (1) can be re-written as follows:

$$p(Y|X) = \frac{\exp(\theta^T F(X, Y))}{Z(\theta, X)}, \quad (3)$$

$$\text{where } Z(\theta, X) = \sum_{Y'} \exp(\theta^T F(X, Y'))$$

Figure 4:
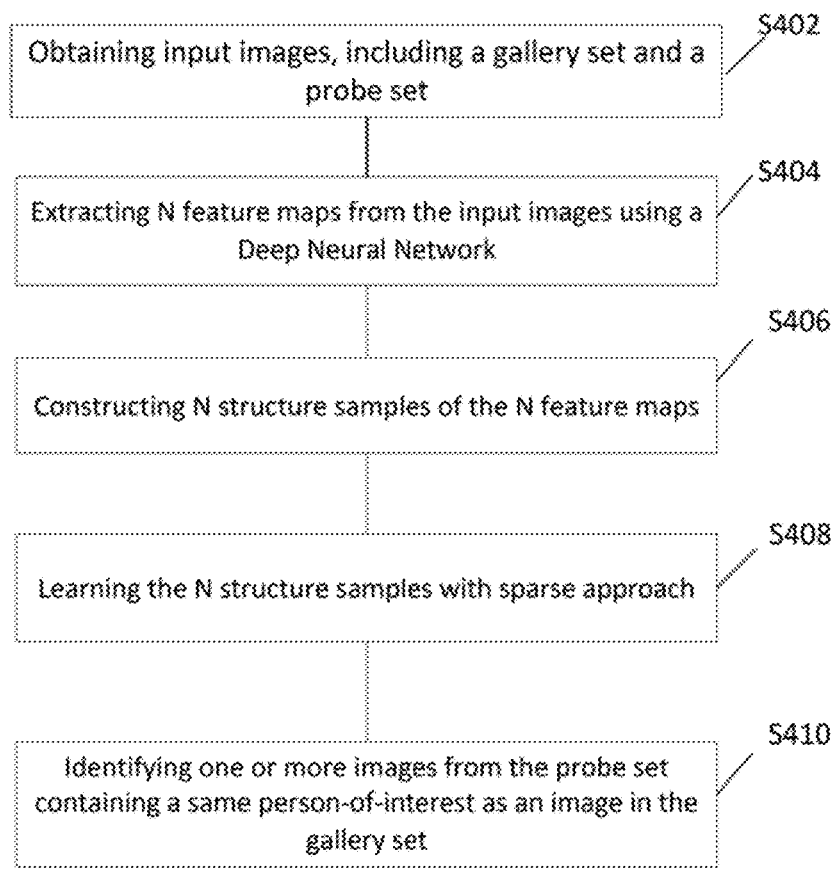
FIG. 4 illustrates a flow chart of an exemplary process for person identity inference consistent with the disclosed embodiments.

FIG. 4 illustrates a flow chart of an exemplary process 400 for person identity inference consistent with the disclosed embodiments. The process 400 may be performed by, for example, the terminal device 106 and/or the server 104. As shown in FIG. 4, a plurality of input images may be obtained (S402). The input images include a gallery set of images containing persons-of-interest, and a probe set of images containing person detections. One input image corresponds to one person.

Further, Deep Neural Network (DNN) may be used to extract N feature maps from the input images (S404). N structure samples of the N feature maps may be constructed using conditional random field (CRF) graphical models (S406). The N structure samples may be learned to perform identity inference.

Structure learning highly depends on the quality of training samples with the assumption that these samples are observations based on the true structural topology of the problem at hand. A conventional practice for evaluating the theoretical soundness of structure learning algorithms is to construct a true structure beforehand and draw samples from this true structure. The learned structure is then compared against this true structure in terms of the selected metric for assessment. For example, a synthetic dataset may be created from a small (e.g., 10-nodes) CRF. The graph structure may be constructed randomly, including each edge with a specified probability. In addition, the node and edge weights are also randomly sampled. Since CRF model is usually used for classification purpose, the learned structure is evaluated in terms of relative classification error rate. However, in real-world settings for person re-identification, the re-id structure cannot be constructed randomly or arbitrarily as in the case of synthetic dataset.

In an exemplary embodiment, based on the formulation in Equations (1) to (3), the disclosed structure learning can discover the unknown true structure underlying a CRF model. Given the interconnected nature of the same person with appearance variations, the CRF may be considered as a family of probabilistic graphical models that can appropriately model the true structure. Accordingly, N structure samples $(Q,Y)=\{(Q_1,Y_1), (Q_2,Y_2) \ldots (Q_N,Y_N)\}$ drawn from such an unknown true structure satisfy a posterior distribution as in Equation (1) or Equation (3), where Q refers to the graph topology of true structure and Y is associated labeling of all the nodes in that structure. Each structure sample $(Q_i,Y_i)$ can be treated as a snapshot of the true structure, which gives an efficient way for drawing each sample numerically.

According to the re-id structure learning problem and CRF model established in Equations (1) to (3), sampling structures from unknown posterior conditionals to re-discover the true structure may be a chicken-and-egg problem. Conventionally, derivation of posterior conditionals needs collecting and re-arranging the relevant terms in the full joint posterior. Samples can be draw from those conditionals directly if $QY_i$ is of a known closed form, e.g., a gamma distribution. In the disclosed embodiments, although CRFs are selected as a family of probabilistic models for those posterior conditionals, neither the underlying graph structure nor the parameters are given. In addition, the disclosed application of person re-identification can learn the structure and parameters simultaneously without any human annotation efforts.

In an exemplary embodiment, the chicken-and-egg problem is circumvented by deep permutation using pre-trained Deep Neural Network (DNN), i.e., sampling structures from N different deep feature maps extracted from the same underlying re-id true structure. Prior to any fully connected layer in DNN, these N different deep feature maps may be produced by the very last convolution layer or a couple of higher convolution layers. The specification of which convolution layer(s) are used may depend on how many structure samples are needed. In some embodiments, the feature maps from the last couple of convolution layers may be used, as these higher-level features are more abstract than lower-level Gabor-like features to depict different aspects of the true structure.

Figure 5:
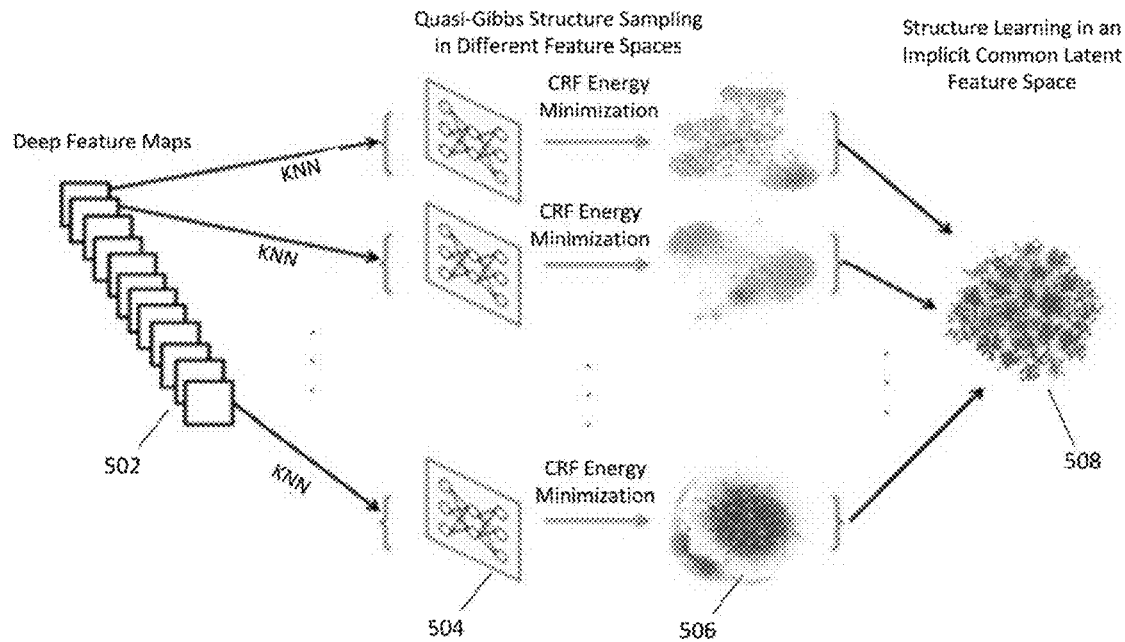
FIG. 5 illustrates another exemplary process for person identity inference consistent with the disclosed embodiments.
Figure 6:
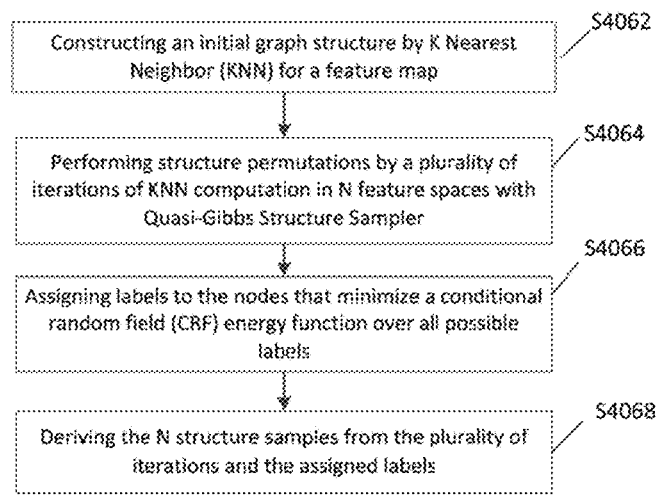
FIG. 6 illustrates a flow chart of an exemplary process for obtaining structure samples consistent with the disclosed embodiments.

Specifically, FIG. 5 illustrates another exemplary process for person identity inference consistent with the disclosed embodiments; and FIG. 6 illustrates a flow chart of an exemplary process for obtaining structure samples (S406) consistent with the disclosed embodiments.

Referring to FIG. 5 and FIG. 6, when the N feature maps 502 are obtained, for each feature map, an initial graph structure/model may be constructed using K Nearest Neighbor (KNN) based on feature similarity in a feature space corresponding to the feature map (S4062). The graph model may include nodes and edges, and each node represents a person detection. Further, deep permutations may be used in the structure sampling process. In other words, structure permutations may be performed by a plurality of iterations of KNN computation in N feature spaces with Quasi-Gibbs Structure Sampler (S4064).

Using deep permutation with feature maps produced based on DNN may have the following advantages. 1) Feature fusion outperforms single random feature since the invariant essence of person appearance variations can hardly, if not impossible, be captured by a single feature. 2) N different deep feature maps, produced by the convolutions between input images and N different kernels sweeping through all the channels in all convolution layers, serve as the basis to approximate any desired deep features. 3) With learned/pre-trained kernels and parameters from a huge dataset, e.g., ImageNet, transferred deep feature can improve generalization performance even after substantial fine-tuning in a new task. Accordingly, these N different deep feature maps provide a desired alternative to the permutation for structure sampling.

Sampling algorithms may be applied to estimate statistics of a posterior distribution as long as there are N simulated samples from that distribution. In one embodiment, sampling algorithms based on Monte Carlo Markov Chain (MCMC) technique may be used. For example, Gibbs sampling can generate posterior samples by sweeping through each variable (or blocks of variables) to sample from its conditional distribution with the remaining variables fixed to their current values. The theory of MCMC guarantees that the stationary distribution of the samples generated using Gibbs sampling is the target joint posterior of interest.

In one embodiment, a Quasi-Gibbs structure sampling approach (S4064) may be applied to generate structure samples for discovering the re-id structure in the context of person re-identification. Provided that X denotes the implicit common latent feature space, $\theta=[V, W]$ denotes all the parameters, and $QY_i$ denotes each variable that the sampling needs to sweep through. According to Equation (3), the posterior conditional (or posterior conditional distribution) for each variable can be written as $P(QY_i=(Q_i,Y_i)|X; QY_1, QY_2, \ldots, QY_{i-1}, QY_{i+1}, \ldots, QY_N; \theta)$, which models the conditional probability of the $i^{th}$ structure sample being evaluated as $(Q_i,Y_i)$, given the implicit common latent feature, all other structure samples, and all the parameters. Thus, the Quasi-Gibbs structure sampling is detailed as follows.

---

Algorithm 1 Quasi-Gibbs Structure Sampler (QGSS)

Initialization $(Q_1, Y_1)^{(0)}, (Q_2, Y_2)^{(0)}, \ldots, (Q_N, Y_N)^{(0)}$
for iteration i =1, 2, ... do
   $(Q_1, Y_1)^{(i)} \sim P(QY_1 = (Q_1, Y_1)|X; QY_2 = (Q_2, Y_2)^{(i-1)}, QY_3 = (Q_3, Y_3)^{(i-1)}, \ldots, QY_N = (Q_N, Y_N)^{(i-1)}; \theta)$
   $(Q_2, Y_2)^{(i)} \sim P(QY_2 = (Q_2, Y_2)|X; QY_1 = (Q_1, Y_1)^{(i)}, QY_3 = (Q_3, Y_3)^{(i-1)}, \ldots, QY_N = (Q_N, Y_N)^{(i-1)}; \theta)$
   .
   .
   .
   $(Q_N, Y_N)^{(i)} \sim P(QY_N = (Q_N, Y_N)|X; QY_1 = (Q_1, Y_1)^{(i)}, QY_2 = (Q_2, Y_2)^{(i)}, \ldots, QY_N = (Q_{N-1}, Y_{N-1})^{(i)}; \theta)$
end for

---

With deep permutation (S4064), the sampling process for each posterior conditional in each deep feature space in iteration i is as follows:

$$(Q_j, Y_j)^{(i)} \sim P(QY_j=(Q_j,Y_j)|X, \ldots, QY_{j-1}=(Q_{j-1},Y_{j-1})^{(i)}, QY_{j+1}=(Q_{j+1},Y_{j+1})^{(i-1)} \ldots; \theta) \quad (4)$$

where j is the index for N structure samples.

Specifically, an initial graph structure 504 $Q_j=G(V,E)$ can be constructed by K Nearest Neighbor (KNN) based on the feature similarity in that particular deep feature space according to the deep feature map 502 (S4062), where V and E refer to all the nodes and edges respectively. A node represents a person detection in an input image. An edge between two nodes represents feature similarity between two person detections corresponding to the two nodes. A node may have m states, m being the quantity of different persons-of-interest in the gallery set.

Given $Q_j$ and a set of possible labels L (e.g., $\{1, 2, \ldots, m\}$), CRF energy minimization is formulated to derive the labeling since the target structure of interest is modeled as CRF. The labeling step (S4066) is to find an assignment of labels to nodes that minimize an energy function E over all possible labels $$Y_j = \{y_1, y_2, \ldots, y_n\} = \underset{Y_j}{\mathrm{argmin}} E(Y_j),$$

(n=|V|). The energy function may be represented by Equation (5):

$$E(Y_j) = \sum_{i \in V} \phi_i(y_i) + \lambda \sum_{(i,j) \in E} \phi_{ij}(y_i, y_j) \quad (5)$$

where $\phi_i(y_i)$ denotes a unary cost potential for assigning label $y_i$ to vertex i, and $\phi_{ij}(y_i,y_j)$ denotes a binary smoothness potential representing the conditional cost of assigning labels $y_i$ and $y_j$ respectively to vertices i and j.

It can be proved that the distribution represented by N samples can converge to the true distribution if the number of iterations of a generic Gibbs sampler is infinite. The first several rounds of iterations may be considered as "burn-in" period since samples in these early iterations are not representative of the true distribution. In some embodiments, the first iterations (e.g., 200 iterations) may be discarded while the later iterations (e.g., 1000 iterations) may be used to compute the statistics of the target distribution. In the disclosed Quasi-Gibbs Structure Sampler (QGSS), the process of CRF energy minimization (S4066) may be postponed until the structure permutations are finished after a preset number of iterations (e.g., 1200) of KNN computation in N different deep feature spaces (S4064). Given the underlying logic of MCMC sampling, a desired expectation can be estimated by ergodic averages $E(Q_j)$, N structure samples can be derived from the 1000 iterations (S4068) using Equation (6):

$$E(Q_j) \approx \frac{1}{1000} \sum_{i=200}^{1200} Q_j^{(i)} = \frac{1}{1000} \sum_{i=200}^{1200} (G, V^{(i)}) \approx G(V, E^*) \quad (6)$$

The edges in E* may only exist when the probability of edge between two nodes exceeds a threshold value $\rho$. That is, nodes having a connected edge can be considered as person-of-interest candidates. The resulted N structure samples $(E(Q_j),Y_j)$ 506 are then fed into the structure-learning algorithm without explicitly deriving the common latent feature space X. In other words, a common latent feature space may be discovered implicitly. Person detections are comparable to each other, thereby constructing the re-id structure capable of inferring the labels of probe images.

Referring to FIG. 4 and FIG. 5, in some embodiments, the structure learning 508 may be processed with a sparse approach (S408). The sparse approach may have several advantages. Fewer parameters exist in the sparse model, and may be estimated more efficiently; and due to the small number of parameters in a sparse structure, typically it is much less costly to estimate the parameters. Further, assuming the dependencies in the dataset can be accurately described within the class of graphical models to-be-searched, the 'true' structure that describes the dependencies in the data set can be found.

Existing approaches for structure learning require a fixed number of nodes in the graph topology, i.e., the learning algorithm is searching for the true structure from a class of graphical models by finding the sparse connections between nodes without adding any new nodes. In the disclosed embodiments, each node refers to one person-of-interest. Although the N structure samples have labeling for all the person detections in both the gallery set and the probe set, only those nodes labeled as persons-of-interest candidates (i.e., nodes with edge connection in the N structure samples) are collected for the final structure learning. When the number of persons-of-interest is relatively small and fixed, searching for connections among these fixed nodes is more computationally tractable than that among all the person detections.

A CRF graphical model representing a re-identification structure may be learned through the N structure samples. The CRF model 508 may be represented using Equations (1) or (3). Neither node features nor edge features are explicitly specified in this formulation. Once the final CRF structure is learned, another energy minimization may be used (S408) to cut the graph into several clusters with each labeled as one person-of-interest (S410).

The maximum likelihood estimation (MLE) may be computed to estimate the parameters of the statistical model, which is define by $$\hat{\theta} \triangleq \operatorname*{argmax}_{\theta} \log p(D \mid \theta).$$

Assuming the training examples are independent and identically distributed (i.e., iid), the log-likelihood may be rewritten as follows: $l(\theta) \triangleq \log p(D|\theta) = \Sigma_{i=1}^{N} \log p(y_i|x_i,\theta)$. Instead of maximizing the log-likelihood, as an equivalent, the negative log-likelihood may be minimized, i.e., $nll = -\Sigma_{i=1}^{N} \log p(y_i|x_i,\theta)$. Accordingly, deriving from Equation (3), the negative log-likelihood and its gradient can be given by Equation (7) and (8) respectively:

$$nll(\theta) = \sum_{i=1}^{N} -\theta^T F(x_n, y_n) + \sum_{i=1}^{N} \log Z(\theta, x_n) \quad (7)$$

$$\nabla nll(\theta) = -\sum_{n} \left[ F(x_n, y_n) - \sum_{Y'} p(Y' \mid x_n, \theta) F(x_n, Y') \right] \quad (8)$$

The regularized structure-learning problem may be formulated by placing a L2 regularizer on the local evidence parameter V (which do not affect the graphical structure directly), and the critical regularizer R(W) (affecting the learned structure) on the edge parameters W.

$$J(\theta) = nll(\theta) + \lambda_2 \|V\|_2^2 + \lambda_1 R(W) \quad (9)$$

is where, $R(W) = \Sigma_{b=1}^{B} (\Sigma_{i \in b} |w_i|^{\alpha})^{1/\alpha} = \Sigma_b \|w_b\|_{\alpha}$ is the edge (structural) regularizer, and $w_b$ corresponds to parameter block b (one block per edge in the graph). If $\alpha = 1$, R(W) degenerates into L1/Lasso regularizer that does not yield sparsity at the block level. In some embodiments, to impose sparsity at the block level and force all the parameters in a block to go to zero is to use $\alpha = 2$ and $\infty$.

This is an unconstraint regularized optimization problem given $\lambda_1$, $\lambda_2$ (whose values may be determined by cross-validation in the experiments). In some embodiments, to ensure sparsity at the block level, the optimization methods may include minimizing two different regularized objectives in Equation (9) when $\alpha = 2$ and $\infty$, which are denoted as $L_1L_2$ and $L_1L_\infty$ respectively.

$$L_1L_2: \min_\theta J(\theta) = nll(\theta) + \lambda_2\|V\|_2^2 + \lambda_1 \sum_b \|w_b\|_2 \quad (10)$$

$$L_1L_\infty: \min_\theta J(\theta) = nll(\theta) + \lambda_2\|V\|_2^2 + \lambda_1 \sum_b \|w_b\|_\infty \quad (11)$$

For the minimization problem (10), the $L_1L_2$ regularizer can be approximated by the multi-quadric function $\|w_b\|_2 \approx \sqrt{w_b^T w_b + \varepsilon}$, and use a limited-memory BFGS algorithm to optimize this differentiable objective for a small positive $\varepsilon$. For problem (11), interior point method requires Hessian as well in this objective. Further, problem (11) may be converted into a constrained optimization by re-formulating in terms of auxiliary variable (one for each set) that are constrained to be the maximum value of a set.

When the minimization problem is solved, the graph model is cut into clusters (i.e., optimal labeling in the graph is obtained). All images in one cluster corresponds to one person-of-interest. That is, one or more images from the probe set containing a same person-of-interest as an image in the gallery set (i.e., in a same cluster) may be identified (S410).

The disclosed embodiments provide structure learning methods for person identity inference. The Quasi-Gibbs structure sampling approach is applied to reveal the true re-id structure in different deep feature spaces that are considered orthogonal, effective in capturing different aspects in visual appearance, and not over-complete. Further, without any human annotation efforts or explicit feature fusion scheme, the re-id structure is learned using sparse approach from an implicit common latent feature space embedded in the structure samples. In contrast to existing technologies, which reveal the labels of all probe images either by the learned bipartite graph directly, or by solving an energy minimization problem on a CRF with a fixed structure, the disclosed embodiments learn the re-id structure among all the persons-of-interest candidates instead of all available person images. As the number and reoccurrence rate of persons-of-interest are relatively small compared to the size of probe sets that is increasing at a rate unprecedentedly seen. Such approach may open a transformative opportunity for person identity inference in practice.

In existing technologies, the underlying topology of a CRF model is usually specified by hand, e.g., a chain structure for sequence labeling, or a 2D lattice for image segmentation. The disclosed embodiments provide a procedure to learn this topology (re-id structure) without requiring human annotation efforts. Further, to address the problem of intra-class variability and inter-class similarity, many feature fusion schemes, ranging from naïve linear combination to multi-view manifold embedding, were introduced in this field. These fusion schemes, however sophisticated, still highly depend on the feature extraction/selection step. For the purpose of structure learning, the disclosed embodiments provide a procedure to learn the CRF topology from different deep feature spaces without explicitly deriving the common latent feature space by feature fusion.

The disclosed method and device may be used in various person identity inference applications, such as, person association in long-term tracking for large video surveillance networks, re-identification of persons-of-interest with unmanned autonomous vehicles (UAV) from different on-board camera views, and persons-of-interest retrieval in multimedia forensics databases.

Further, the disclosed method and device may be applied in re-identification applications other than person identity inference. For example, the disclosed method may be used to re-identify cars, animals, and other moving objects in different camera views.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A method for visual appearance based person identity inference, comprising:

obtaining a plurality of input images, wherein the input images include a gallery set of images containing persons-of-interest and a probe set of images containing person detections, and one input image corresponds to one person;

extracting N feature maps from the input images using a Deep Neural Network (DNN), N being a natural number;

constructing N structure samples of the N feature maps using conditional random field (CRF) graphical models, comprising:

for a feature map, constructing an initial graph structure by K Nearest Neighbor (KNN) based on feature similarity in a feature space corresponding to the feature map, the graph model including nodes and edges, a node representing one person;

performing structure permutations by a plurality of iterations of KNN computation in N feature spaces with a Quasi-Gibbs Structure Sampling (QGSS) process;

assigning labels to the nodes that minimize a conditional random field (CRF) energy function over all possible labels, wherein the all possible labels represent all different persons-of-interest in the gallery set; and deriving the N structure samples from the plurality of iterations and the assigned labels;

learning the N structure samples from an implicit common latent feature space embedded in the N structure samples; and according to the learned structures, identifying one or more images from the probe set containing a same person-of-interest as an image in the gallery set.

2. The method according to claim 1, wherein:
the plurality of iterations include first a iterations and later b iterations, wherein a and b are natural numbers;
results of the first a iterations are discarded, and
the N structure samples are derived from the later b iterations.

3. The method according to claim 1, wherein:
a node in the graph model has m possible states, m representing a quantity of different persons-of-interest in the gallery set.

4. The method according to claim 1, wherein:
the labels are assigned to the nodes according to the graph structure after the plurality of iterations are finished.

5. The method according to claim 1, wherein:
a graph of a CRF model representing a re-identification structure is learned through the N structure samples; and
an energy minimization with sparse approach is performed to cut the graph into a plurality of clusters, each cluster containing images corresponding to one of the persons-of-interest.

6. The method according to claim 1, wherein
N different kernels are used in the DNN for convolutions with the images in the gallery set and the probe set; and
the N feature maps are produced by a last couple of convolution layers in the DNN.

7. The method according to claim 5, wherein the CRF model with pairwise potentials is:

$$p(Y|X) = \frac{1}{Z(X)} \prod_{\langle i,j \rangle} \psi_{ij}(y_i, y_j, X) \prod_i \psi_i(y_i, X)$$

wherein: $\langle i,j \rangle$ is product over all edges in the graph, $\psi_i$ is a node potential and $\psi_i$ is an edge potential, X denotes the common latent features derived from the N structure samples implicitly; and Y denotes to labeling of person-of-interest candidates.

8. A device for visual appearance based person identity inference, comprising one or more processors configured to:

obtain a plurality of input images, wherein the input images include a gallery set of images containing persons-of-interest and a probe set of images containing person detections, and one input image corresponds to one person;

extract N feature maps from the input images using a Deep Neural Network (DNN), N being a natural number;

construct N structure samples of the N feature maps using conditional random field (CRF) graphical models, comprising:

for a feature map, constructing an initial graph structure by K Nearest Neighbor (KNN) based on feature similarity in a feature space corresponding to the feature map, the graph model including nodes and edges, a node representing one person;

performing structure permutations by a plurality of iterations of KNN computation in N feature spaces with a Quasi-Gibbs Structure Sampling (QGSS) process;

assigning labels to the nodes that minimize a conditional random field (CRF) energy function over all possible labels, wherein the all possible labels represent all different persons-of-interest in the gallery set; and deriving the N structure samples from the plurality of iterations and the assigned labels;

learn the N structure samples from an implicit common latent feature space embedded in the N structure samples; and according to the learned structures, identify one or more images from the probe set containing a same person-of-interest as an image in the gallery set.

9. The device according to claim 8, wherein:
the plurality of iterations include first a iterations and later b iterations, wherein a and b are natural numbers;
results of the first a iterations are discarded, and
the N structure samples are derived from the later b iterations.

10. The device according to claim 8, wherein:
a node in the graph model has m possible states, m representing a quantity of different persons-of-interest in the gallery set.

11. The device according to claim 8, wherein:
the labels are assigned to the nodes according to the graph structure after the plurality of iterations are finished.

12. The device according to claim 8, wherein:
a graph of a CRF model representing a re-identification structure is learned through the N structure samples; and
an energy minimization with sparse approach is performed to cut the graph into a plurality of clusters, each cluster containing images corresponding to one of the persons-of-interest.

13. The device according to claim 8, wherein
N different kernels are used in the DNN for convolutions with the images in the gallery set and the probe set; and
the N feature maps are produced by a last couple of convolution layers in the DNN.

14. The device according to claim 12, wherein the CRF model with pairwise potentials is:

$$p(Y \mid X) = \frac{1}{Z(X)} \prod_{\langle i,j \rangle} \psi_{ij}(y_i, y_j, X) \prod_i \psi_i(y_i, X)$$

wherein: $\langle i,j \rangle$ is product over all edges in the graph, $\psi_i$ is a node potential and $\psi_i$ is an edge potential, X denotes the common latent features derived from the N structure samples implicitly; and Y denotes to labeling of person-of-interest candidates.

* * * * *